United States Patent [19]

Kobayashi et al.

[11] Patent Number: 4,691,526
[45] Date of Patent: Sep. 8, 1987

[54] AIR CONDITIONING UNIT FOR VEHICLE

[75] Inventors: Hisao Kobayashi; Katsunori Kawai; Hiroyuki Deguchi, all of Kariya, Japan

[73] Assignee: Kabushiki Kaisha Toyoda Jidoshokki Seisakusho, Aichi, Japan

[21] Appl. No.: 856,762

[22] Filed: Apr. 28, 1986

[30] Foreign Application Priority Data

May 8, 1985 [JP] Japan .................................. 60-97541

[51] Int. Cl.$^4$ ........................ F25B 31/00; F25B 41/04
[52] U.S. Cl. ...................... 62/217; 417/269; 417/295
[58] Field of Search ................. 62/217; 417/295, 269, 417/270

[56] References Cited

U.S. PATENT DOCUMENTS

| | | | |
|---|---|---|---|
| 3,365,905 | 1/1968 | Barbier | 62/217 X |
| 4,366,834 | 1/1983 | Hanson et al. | 417/295 X |
| 4,522,567 | 6/1985 | Kato et al. | 417/270 |

Primary Examiner—William E. Tapolcai
Attorney, Agent, or Firm—Burgess, Ryan and Wayne

[57] ABSTRACT

An air conditioning unit for cooling and dehumidifying a passenger room of a vehicle including a reciprocatory piston type refrigerant compressor having a refrigerant suction chamber, a compressed refrigerant discharge chamber, and an independent drive chamber for a drive mechanism to reciprocate compressor piston, a condenser, an expansion valve, an evaporator for thermal exchange, and an evaporating pressure control valve adjustably changing a fluid communication between the evaporator and the suction chamber of the compressor in response to a change is a cooling load. The air conditioning unit further includes a fluid bypass passageway providing a constant fluid communication between the evaporator and the drive chamber of the compressor regardless of the change in the cooling load so that a part of a lubricant containing refrigerant is always introduced into the drive chamber.

6 Claims, 6 Drawing Figures

AIR CONDITIONING UNIT FOR VEHICLE

BACKGROUND OF THE INVENTION

1. Field of the Invention

The present invention relates to an air conditioning unit for a vehicle.

2. Description of the Related Art

Generally, a compressor of an air conditioning unit for a vehicle is operated intermittently to prevent excessive cooling and a subsequent failure in cooling due to the freezing of an evaporator. The intermittent operation of the compressor causes, however, a variation in the cooling capacity and varies widely the temperature of cooled air to be supplied into a passenger room of a vehicle. As a result, the cooling effect will be deteriorated.

The compressor of an air conditioning unit is driven by a vehicle engine, and since the intermittent operation is realized by the engagement and disengagement of a clutch unit disposed between the engine and the compressor, the smoothness of the driving of the vehicle is also deteriorated. Therefore, there is a demand for the provision of a low cost mechanism in which a compressor capacity (compressor displacement) is adjusted according to the cooling load, to minimize or eliminate intermittent operation of the compressor and to stabilize the temperature of cooled air to be supplied, thus improving the cooling effect in the passenger room as well as the smoothness of the vehicle driving.

In order to meet the above requirement, there is proposed a prior art example in which a spool valve type evaporating pressure regulator is disposed in a suction piping which forms a return circuit for the refrigerant of the vehicle air conditioning unit. The regulator adjusts the pressure of an evaporator according to the magnitude of the cooling load to maintain the temperature of evaporator above a predetermined value. However, the spool valve type evaporating pressure regulator has a drawback in that lubricant is not sufficiently supplied to the compressor of the air conditioning unit when the spool valve is in an almost completely closed state.

SUMMARY OF THE INVENTION

It is an object of the present invention to overcome the above-described drawback of the vehicle air conditioning unit of the prior art.

It is another object of the present invention to provide an air conditioning unit for a vehicle, in which a lubrication state in a compression chamber of a compressor can be kept at a good condition even when the compressor is operated with a small compressor displacement.

In order to accomplish the objects and advantages mentioned above, the present invention provides an air conditioning unit for a vehicle, comprising a compressor having suction chambers, discharge chambers, and a drive chamber which incorporates a piston drive mechanism and is formed to be independent of the suction chambers. The air conditioning unit further comprises a condenser, an expansion valve, an evaporator, and an evaporating pressure regulator valve, which are disposed in an air conditioning circuit which includes a circulation piping arranged between the discharge and suction chambers of the compressor. A piping portion from the evaporator to the evaporating pressure regulator valve communicates with the drive chamber through a bypass passageway. According to the above arrangement, even if the compressor is continuously operated with a low compression capacity, a small amount of refrigerant sucked via the bypass passageway is moved from the drive chamber such as a swash plate chamber to compression chambers during the suction stroke of each compression chamber, thereby realizing a smooth lubrication in the drive chamber.

BRIEF DESCRIPTION OF THE DRAWINGS

Other objects, features, and advantages of the present invention will be made more apparent from the ensuing description of the embodiments thereof with reference to the accompanying drawings wherein.

DESCRIPTION OF PREFERRED EMBODIMENTS

Figure 5:
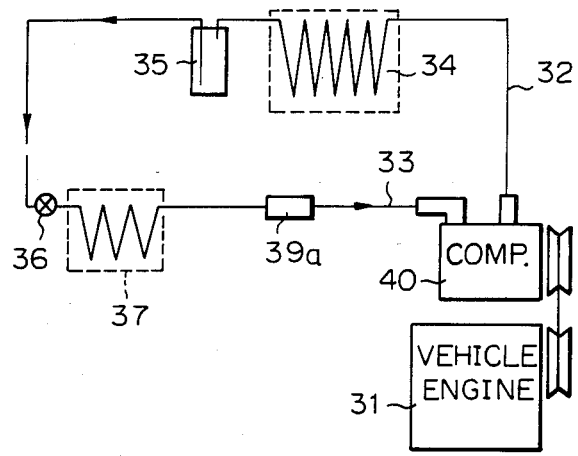
FIG. 5 is a circuit diagram showing schematically a prior art air conditioning unit.
Figure 6:
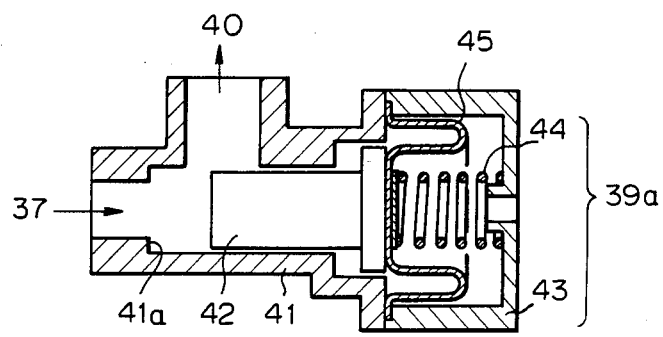
FIG. 6 is a longitudinal cross-sectional view taken along the center of an evaporating pressure regulator valve of the prior art.

Before describing the preferred embodiments of the present invention, an explanation will be given of the prior art air conditioning unit for a vehicle, for reference. FIG. 5 shows a known air conditioning unit for a vehicle, in which a suction piping 33 extends from an evaporator 37 to a compressor 40, and an evaporating pressure regulator valve 39a shown in FIG. 6 is connected to the suction piping 33 to maintain the temperature of evaporator 37 above a predetermined value. When the cooling load is raised and the inner pressure on the evaporator side is increased, a spool valve 42 enclosed in a casing 41 is moved together with a bellows 45 toward an open position against resultant forces of the atmospheric pressure and of a spring 44 enclosed in a casing 43. On the other hand, when the cooling load is lowered and the inner pressure on the evaporator side decreases, the spool valve 42 closes a valve port 41a due to the resultant forces of the atmospheric pressure and the spring 44.

The prior art air conditioning unit mentioned above has a drawback in that lubricant is not sufficiently supplied to the compressor 40 when the spool valve 42 is in an almost completely closed state.

Figure 1:
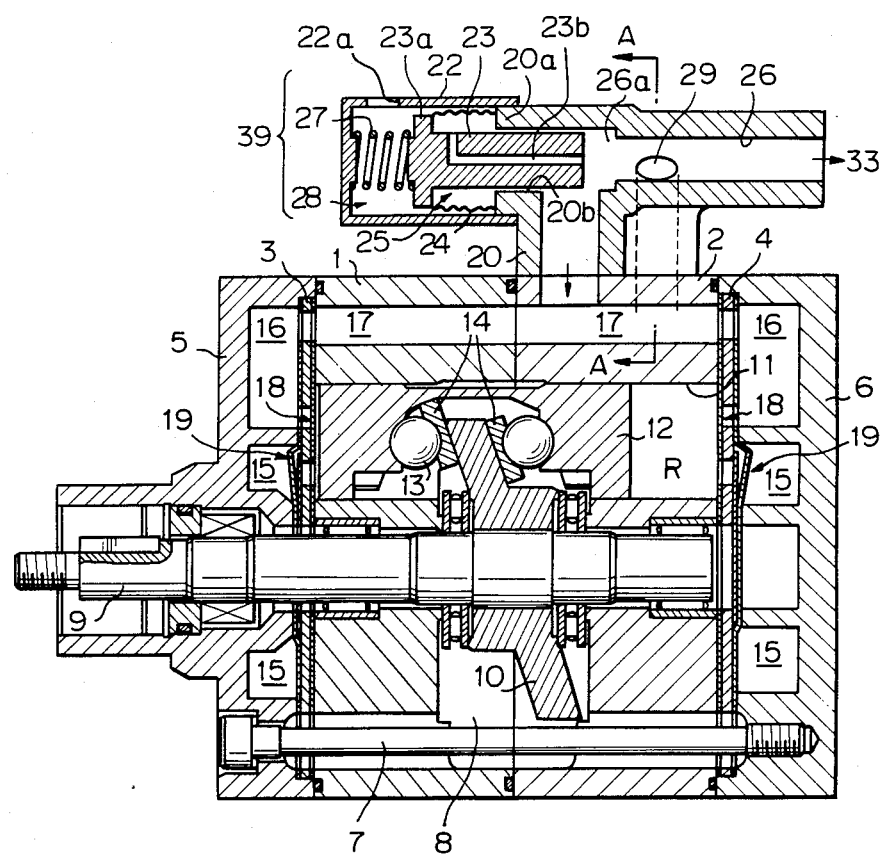
FIG. 1 is a longitudinal cross-sectional view taken along the center of an example of a swash plate type compressor adopted for the first embodiment of the present invention.
Figure 2:
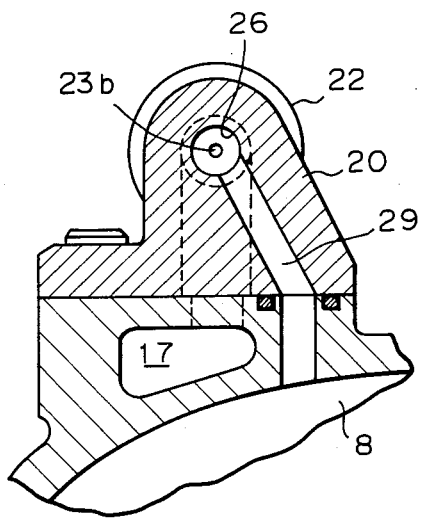
FIG. 2 is an enlarged cross-sectional view taken along the line A—A shown in FIG. 1.

The first embodiment of the present invention will now be described with reference to FIGS. 1 to 3. Valve plates 3 and 4, and front and rear casings 5 and 6 are fixed to the ends of cylinder blocks 1 and 2 by means of a proper number of screw bolts 7. At a joining portion between the cylinder blocks 1 and 2, a swash plate chamber 8 is formed as a drive chamber for pistons 12, which are described later. The swash plate chamber 8 encloses a swash plate 10 which is fixed to a drive shaft 9. Five pairs (only one pair is shown) of cylinder bores 11 are provided in the cylinder blocks 1 and 2 to receive the pistons 12 which are fitted to the swash plate 10 through balls 13 and shoes 14.

Discharge chambers 15 are formed on the center sides of the front and rear casings 5 and 6, and suction chambers 16 are formed on the peripheral sides thereof. The suction chambers 16 communicate with each other through suction passageways 17 provided in the cylinder blocks 1 and 2 and the valve plates 3 and 4. Suction valve portions 18 and discharge valve portions 19 are formed on the valve plates 3 and 4.

An L-shape suction flange 20 is fixed to the cylinder block 2 so as to be communicated with the suction passageways 17, and a discharge flange 21 (FIG. 3) is fixed so as to be communicated with the discharge chambers 15. A cylindrical casing 22 having a closed bottom is screwed and fixed into a boss portion 20a of the suction flange 20. A cylindrical spool valve 23 is slidably inserted into a through-hole 20b formed at the center of boss portion 20a. A bellows 24 is connected between a base end portion 23a of the spool valve 23 and the boss portion 20a. A pressure chamber 25 formed between the spool valve 23 and the bellows 24 communicates with a suction passageway 26 in the suction flange 20 through a pressure passageway 23b formed in the spool valve 23. A coil spring 27 is disposed between the spool valve 23 and the bottom of cylindrical casing 22 to constantly urge the spool valve 23 toward a valve port 26a provided in the middle of the suction passageway 26. A chamber of the cylindrical casing 22 on the spring 27 side forms an atmospheric chamber 28 which communicates with the atmosphere through an opening 22a provided on the casing 22. As mentioned above, the suction flange 20 is integrally provided with an evaporating pressure regulator valve 39 including the cylindrical casing 22, spool valve 23, bellows 24, spring 27, etc.

In the vicinity of the valve port 26a of the suction flange 20, one end of a bypass passageway 29 which communicates with the swash plate chamber 8 is open in such a manner that refrigerant gas in the suction passageway 26 can be introduced into the swash plate chamber 8 even when the valve port 26a inside the suction flange 20 is closed by the spool valve 23.

Figure 3:
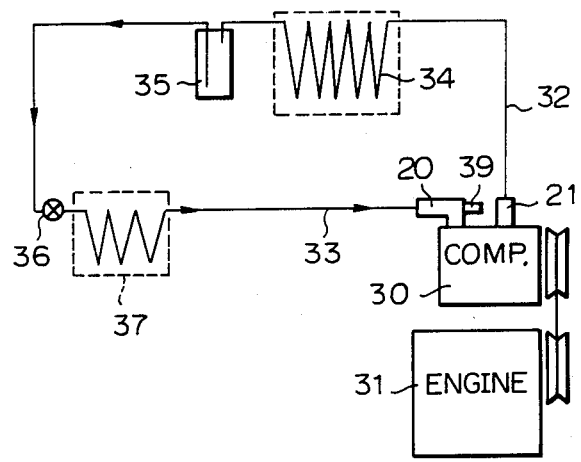
FIG. 3 is a circuit diagram showing schematically an air conditioning unit for a vehicle.

The swash plate type compressor 30 with the arrangement mentioned above is driven by a vehicle engine 31, as shown in FIG. 3, and constitutes an air conditioning unit for a vehicle, together with a condenser 34 and a receiver 35 which are connected to the discharge piping 32 and a suction piping 33, and an expansion valve 36 and an evaporator 37 which are disposed in a passenger room of the vehicle.

The operation of the above air conditioning unit will now be described.

If the temperature of the passenger room is high and a high cooling load is required at the time of, for instance, engine startup, the temperature of the evaporator 37 which performs heat exchange, climbs, to increase the saturation pressure of the refrigerant. Accordingly, the pressure in the suction piping 33 is increased to increase the pressure in the pressure chamber 25. As a result, the spool valve 23 is moved against the resultant forces of the pressure of the atmospheric chamber 28 and the spring 27 to open the valve port 26a of the suction passageway 26, thereby achieving a full capacity operation.

Subsequently, if the temperature of the passenger room is lowered and thus the cooling load decreased, the temperature of evaporator 37 and the saturation pressure are also lowered. With the lowering of the saturation pressure, the pressure in the suction passageway 26 (suction piping 33) is decreased to lower the pressure in the pressure chamber 25. When the pressure in the suction passageway 26 and the pressure in the pressure chamber 25 become constant, the pressure in the pressure chamber 25 and the resultant forces of the atmospheric pressure and spring 27 are balanced to hold the spool valve 23 at a specified opening and carry out an intermediate capacity operation.

If the temperature of the passenger room is further lowered to further reduce the cooling load, the pressure in the pressure chamber 25 tends to be lowered. At this moment, the spool valve 23 is moved toward a closing position to reduce the opening of valve port 26a so that the lowering of the pressure in the suction piping 33 will be suppressed and the pressure in the evaporator 37 will be maintained above a predetermined value. As a result, the temperature of the evaporator 37 is stabilized at a predetermined value to supply cooled air at a stabilized temperature, and freezing of the evaporator 37 is prevented.

On the other hand, if a continuous operation is performed when the valve port 26a of the suction flange 20 is completely closed by the spool valve 23, the supply of refrigerant from the suction piping 33 is stopped so that a compression chamber R (space in each of the cylinder bores 11) may hold a negative pressure during the suction stroke of the reciprocation of each piston 12. Due to a clearance, etc., between each piston 12 and each cylinder bore 11, a small amount of refrigerant is sucked to flow from the swash plate chamber 8 to each compression chamber R. At this moment, the refrigerant containing lubricant is being introduced into the swash plate chamber 8 through the bypass passageway 29, to supply the lubricant to the sliding portions such as the pistons 12, shoes 14, and swash plate 10. As a result, the wear and friction at the sliding portions will be prevented.

Figure 4:
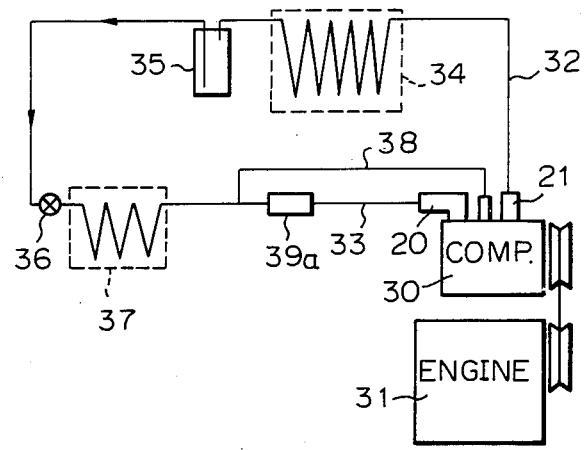
FIG. 4 is a circuit diagram showing schematically the second embodiment of the present invention.

FIG. 4 shows the second embodiment of the present invention. In this embodiment, the evaporating pressure regulator valve 39a is provided in the middle of the suction piping 33. When the evaporating pressure regulator valve 39a is completely closed, the suction piping 33 on the evaporator side communicates with the swash plate chamber 8 through a bypass passageway 38. This embodiment is advantageous in that the swash plate chamber 8 can be constantly lubricated.

The present invention also can be embodied in the following constructions:

(1) The present invention is applicable not only for the swash plate type compressor 30 but also for a crank type compressor, a wobble plate type compressor, and other reciprocatory piston type compressors. In the case of the crank type compressor, a crankcase for receiving therein a crank mechanism becomes the drive chamber.

(2) It is possible to provide a slight communication between the swash plate chamber 8 and the suction chamber 16 by provision of an appropriate narrow fluid passageway extending from the swash plate chamber 8 to the suction chamber 16. In this case, the refrigerant can be supplied to the suction chamber 16 even when the evaporating pressure regulator valve 39 completely closes a suction passageway between the evaporator 37 and the suction chamber 16. Accordingly, overheating at the suction chamber 16 can be avoided. Thus, a continuous running of the compressor can be carried out with the risk of a failure in operation.

As is understood from the foregoing description of the embodiments, the present invention provides an advantage such that the lubrication of compression chambers can be smoothly and effectively accomplished by causing a small amount of refrigerant containing therein a lubricant, which is introduced via the bypass passageway, to flow from the drive chamber to respective compression chambers of the cylinder bores even when the compressor is operated at a low displacement condition.

Further, according to the present invention, some constructional elements of the evaporating pressure regulator valve, e.g., the casing, can be formed as common constructional parts with the compressor body, i.e., the suction flange, so that the number of parts may be reduced resulting in a low price air conditioning unit for a vehicle, and the piping arrangement can be readily fitted to vehicles.

It should be understood that many variations and modifications will occur to a person skilled in the art without departing from the spirit and scope of the present invention.

We claim:

1. An air conditioning unit for a vehicle, comprising:
   a reciprocatory piston type refrigerant compressor having a suction chamber for a refrigerant before compression, a suction passageway fluidly connected with said suction chamber, a discharge chamber for a refrigerant after compression, and a drive chamber formed to be independent of the suction and discharge chambers and accommodating therein a drive mechanism for reciprocating pistons in compressor cylinders, the drive mechanism being driven by a vehicle engine, and said drive chamber being separated from said suction passageway;
   a first piping circuit for delivering said refrigerant after compression from said discharge chamber of said compressor toward an evaporator for conducting a thermal exchange of said refrigerant;
   a second piping circuit for returning said refrigerant after thermal expansion from said evaporator toward said suction chamber of said compressor through said suction passageway;
   a condenser arranged in said first piping circuit for condensing said refrigerant after compression, delivered from said discharge chamber of said compressor;
   an expansion valve arranged in said first piping circuit between said condenser and said evaporator for controlling a flow rate of said refrigerant after condensation;
   a pressure control valve arranged in said second piping circuit between said evaporator and said suction passageway of said compressor for controlling an evaporating pressure within said evaporator in response to a cooling load applied to said air conditioning unit;
   a fluid bypass passageway means arranged in said second piping circuit for providing a constant fluid communication between said evaporator and said drive chamber of said compressor, thereby permitting said refrigerant after said thermal exchange to flow into said drive chamber even when said cooling load applied to said air conditioning unit is low, said fluid bypass passageway means being directly connected to said drive chamber and not connected with said suction passageway; and
   said reciprocatory piston type refrigerant compressor comprises a swash plate type compressor provided with a swash plate rotatably mounted on a drive shaft operatively connected to said vehicle engine, said swash plate being rotated in a swash plate chamber formed as said drive chamber and fluidly communicated with said cylinders via clearances between said pistons and cylindrical walls of said cylinders.

2. An air conditioning unit according to claim 1, wherein said pressure control valve is a pressure sensitive spool valve integrally attached to a suction flange mounted on said compressor to introduce said refrigerant after said thermal exchange into said suction chamber, said pressure sensitive spool valve comprising a cylindrical casing fixed to said suction flange and defining therein a first atmospheric pressure chamber, a spool valve movably mounted in said cylindrical casing to adjustably open and close a suction valve port of a suction passageway formed in said suction flange, a spring member arranged in said atmospheric pressure chamber of said cylindrical casing for constantly urging said spool valve toward a position closing said suction valve port, and an elastic bellows member elastically and sealingly arranged between said cylindrical casing and said spool valve for defining a suction pressure chamber separated from said atmospheric chamber.

3. An air conditioning unit according to claim 2, wherein said fluid bypass passageway means comprises a passageway portion formed in said flange in parallel with said suction passageway of said suction flange, said passageway portion directly opening toward said drive chamber of said compressor.

4. An air conditioning unit according to claim 2, wherein said suction valve port of said suction passageway of said flange is a counterbore formed in said flange so as to be complementary to an end of said spool valve.

5. An air conditioning unit for a vehicle, comprising:
   a reciprocatory piston type refrigerant compressor having a suction chamber for a refrigerant before compression, a discharge chamber for a refrigerant after compression, and a drive chamber formed to be independent of the suction and discharge chambers and accommodating therein a drive mechanism for reciprocating pistons in compressor cylinders, the drive mechanism being driven by a vehicle engine;
   a first piping circuit for delivering said refrigerant after compression from said discharge chamber of said compressor toward an evaporator for conducting a thermal exchange of said refrigerant;
   a second piping circuit for returning said refrigerant after thermal expansion from said evaporator toward said suction chamber of said compressor;
   a condenser arranged in said first piping circuit for condensing said refrigerant after compression, delivered from said discharge chamber of said compressor;
   an expansion valve arranged in said first piping circuit between said condenser and said evaporator for controlling a flow rate of said refrigerant after condensation;
   a pressure control valve arranged in said second piping circuit between said evaporator and said suction chamber of said compressor for controlling an evaporating pressure within said evaporator in response to a cooling load applied to said air conditioning unit, wherein said pressure control valve is a pressure sensitive spool valve integrally attached to a suction flange mounted on said compressor to introduce said refrigerant after said thermal exchange into said suction chamber, said pressure sensitive spool valve comprising a cylindrical casing fixed to said suction flange and defining therein a first atmospheric pressure chamber, a spool valve movably mounted in said cylindrical casing to adjustably open and close a suction valve port of a suction passageway formed in said suction flange, a spring member arranged in said atmospheric pressure chamber of said cylindrical casing for constantly urging said spool valve toward a position closing said suction valve port, and an elastic bellows member elastically and sealingly arranged between said cylindrical casing and said spool valve for defining a suction pressure chamber separated from said atmospheric chamber; and a fluid bypass passageway means arranged in said second piping circuit for providing a constant fluid communication between said evaporator and said drive chamber of said compressor, thereby permitting said refrigerant after said thermal exchange to flow into said drive chamber even when said cooling load applied to said air conditioning unit is low, said fluid bypass passageway means including a passageway portion formed in said flange in parallel with said suction passageway of said suction flange, said passageway portion directly opening toward said drive chamber of said compressor.

6. An air conditioning unit for a vehicle, comprising:

a reciprocatory piston type refrigerant compressor having a suction chamber for a refrigerant before compression, a discharge chamber for a refrigerant after compression, and a drive chamber formed to be independent of the suction and discharge chambers and accommodating therein a drive mechanism for reciprocating pistons in compressor cylinders, the drive mechanism being driven by a vehicle engine;

a first piping circuit for delivering said refrigerant after compression from said discharge chamber of said compressor toward an evaporator for conducting a thermal exchange of said refrigerant;

a second piping circuit for returning said refrigerant after thermal expansion from said evaporator toward said suction chamber of said compressor;

a condenser arranged in said first piping circuit for condensing said refrigerant after compression, delivered from said discharge chamber of said compressor;

an expansion valve arranged in said first piping circuit between said condenser and said evaporator for controlling a flow rate of said refrigerant after condensation;

a pressure control valve arranged in said second piping circuit between said evaporator and said suction chamber of said compressor for controlling an evaporating pressure within said evaporator in response to a cooling load applied to said air conditioning unit, wherein said pressure control valve is a pressure sensitive spool valve integrally attached to a suction flange mounted on said compressor to introduce said refrigerant after said thermal exchange into said suction chamber, said pressure sensitive spool valve comprising a cylindrical casing fixed to said suction flange and defining therein a first atmospheric pressure chamber, a spool valve movably mounted in said cylindrical casing to adjustably open and close a suction valve port of a suction passageway formed in said suction flange, a spring member arranged in said atmospheric pressure chamber of said cylindrical casing for constantly urging said spool valve toward a position closing said suction valve port, and an elastic bellows member elastically and sealingly arranged between said cylindrical casing and said spool valve for defining a suction pressure chamber separated from said atmospheric chamber, and said suction valve port of said suction passageway of said flange is a counterbore formed in said flange so as to be complementary to an end of said spool valve; and a fluid bypass passageway means arranged in said second piping circuit for providing a constant fluid communication between said evaporator and said drive chamber of said compressor, thereby permitting said refrigerant after said thermal exchange to flow into said drive chamber even when said cooling load applied to said air conditioning unit is low.

* * * * *